United States Patent [19]

Fukahori et al.

[11] Patent Number: 4,565,432

[45] Date of Patent: Jan. 21, 1986

[54] MOTOR DRIVEN CAMERA

[75] Inventors: Hidehiko Fukahori, Kanagawa; Masahisa Fujino; Toshihiko Satoh, both of Tokyo, all of Japan

[73] Assignee: Canon Kabushiki Kaisha, Tokyo, Japan

[21] Appl. No.: 636,400

[22] Filed: Jul. 31, 1984

[30] Foreign Application Priority Data

Aug. 5, 1983 [JP] Japan .............................. 58-143515

[51] Int. Cl.$^4$ .............................................. G03B 1/18
[52] U.S. Cl. ............................................. 354/173.11
[58] Field of Search ................ 354/173.1, 173.11, 217, 354/218

[56] References Cited

U.S. PATENT DOCUMENTS 3,710,705  1/1973  Kimura ........................... 354/173.1
4,304,481 12/1981  Ichiyanagi ..................... 354/173.11

Primary Examiner—William B. Perkey
Attorney, Agent, or Firm—Toren, Mcgeady, Stanger, Goldberg & Kiel

[57] ABSTRACT

The disclosed device controls the speed of a camera's motor driven film feed. Upon detection of the initiation of a blank frame feed operation, the high speed frame mode is selected to automatically feed the film a predetermined number of frames and then automatically return to a preset frame speed mode. Upon detection of the initiation of a film load operation, the slow speed frame mode is selected.

20 Claims, 3 Drawing Figures

MOTOR DRIVEN CAMERA

BACKGROUND OF THE INVENTION

1. Field of the Invention

This invention relates to a motor driven camera having a film feed and a plurality of frame speed modes, and more particularly to a device for controlling the frame speed as necessity arises.

2. Description of the Prior Art

Prior art proposals for automatically feeding blank frames of film by a prescribed number of frames had suggested using either a film counter or, as electronics developed, an electronic counter, as part of the control device for the camera. Even though most motor driven cameras have a mode selector for changing the frame speed, the frame speed at which blank frames are fed is limited to the value chosen for the preset modes of operation during shooting. When the preset mode is a slow speed, a drawback is introduced, namely, that the primary advantage of motorizing the camera is not fully utilized.

When loading film, the use of a slow frame speed makes the loading operation easy. Up to now, however, the operation had to preliminarily switch the mode selector to the slow speed frame mode. After the completion of the loading operation, the operator then had to reset the mode selector to the high speed frame mode for the purpose of feeding two or three blank frames of film to wind off the exposed leader. This troublesome operation gave rise to several problems.

SUMMARY OF THE INVENTION

A first object of the present invention is to provide a motor driven camera in which, when feeding blank frames of film, the frame mode is automatically set to the fastest speed, thereby fully utilizing the mobility of the motor driven camera.

A second object of the present invention is to provide a motor driven camera capable of selecting frame speed modes of film externally, wherein said blank frames of the film are fed, the frame speed mode is automatically set to the fastest speed, and, at completion of the blank frame feeding operation, is automatically returned to the preselected frame speed, whereby the mobility of the motor driven camera is fully utilized and good manageability is obtained.

A third object of the present invention is to provide a motor driven camera in which, when it is loaded with film, the frame speed is automatically set to a slow value effective, particularly, for a single shot, whereby good manageability is obtained.

Other objects of the present invention will become apparent from the following detailed description of the present invention.

DETAILED DESCRIPTION OF THE PREFERRED EMBODIMENTS

The present invention will next be described in connection with an embodiment thereof by reference to the drawings.

Figure 1:
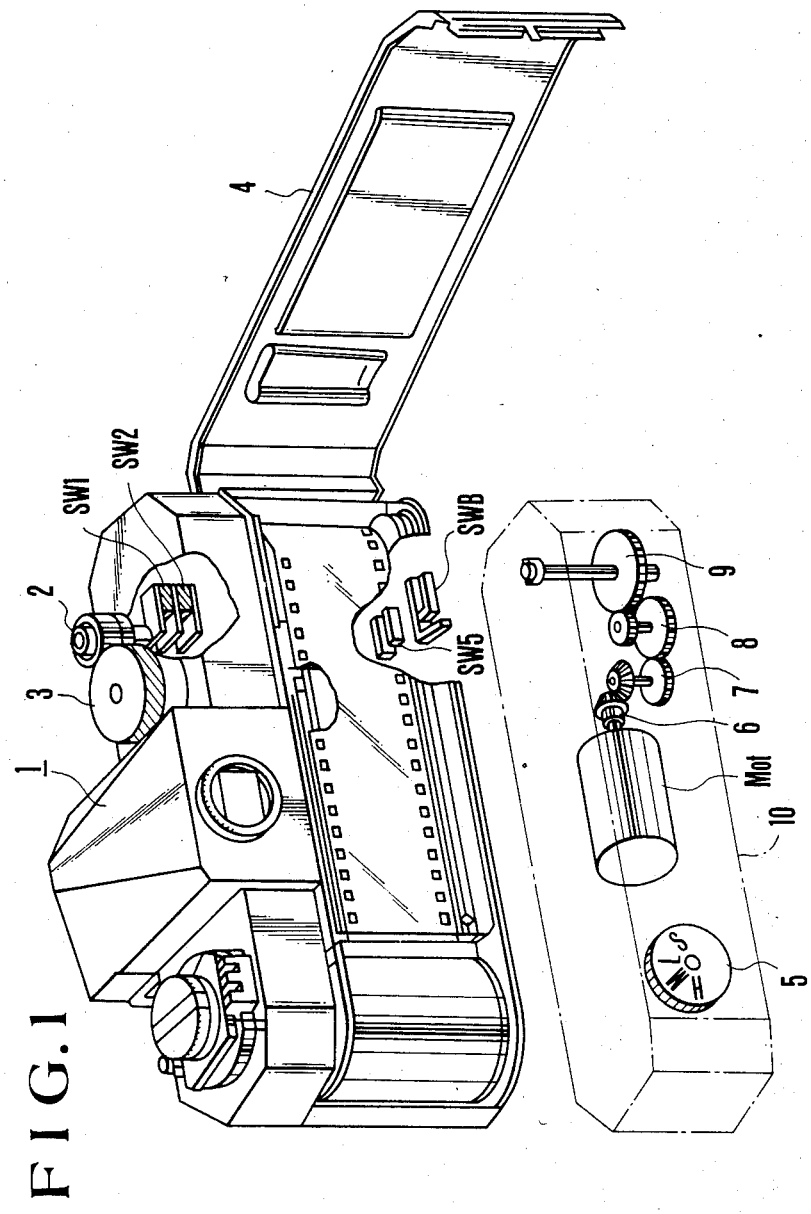
FIG. 1 is a perspective view of an embodiment of a motor driven camera according to the present invention with portions broken away to illustrate the construction thereof.

FIG. 1 illustrates a motor driven camera wherein 1 is a body of the motor driven camera. A release button 2 is arranged upon its first stroke to turn on a light metering switch SW1 and upon its second stroke to turn on a release switch SW2. A shutter dial 3 gives shutter speed information to an exposure control circuit (not shown). A back cover 4 serves as an actuator for a switch SWB. A mode selector 5 is operatively connected to a frame speed changeover switch (not shown). Gears 6, 7, 8, and 9 in a train transmit the output of a motor Mot to film winding and camera charging mechanisms (not shown). An exposure completion switch SW5 is arranged to turn on when the trailing curtain of a shutter has run down. A motor driven unit 10 may be either built in, or releasably attached to, the camera body 1.

Figure 2:
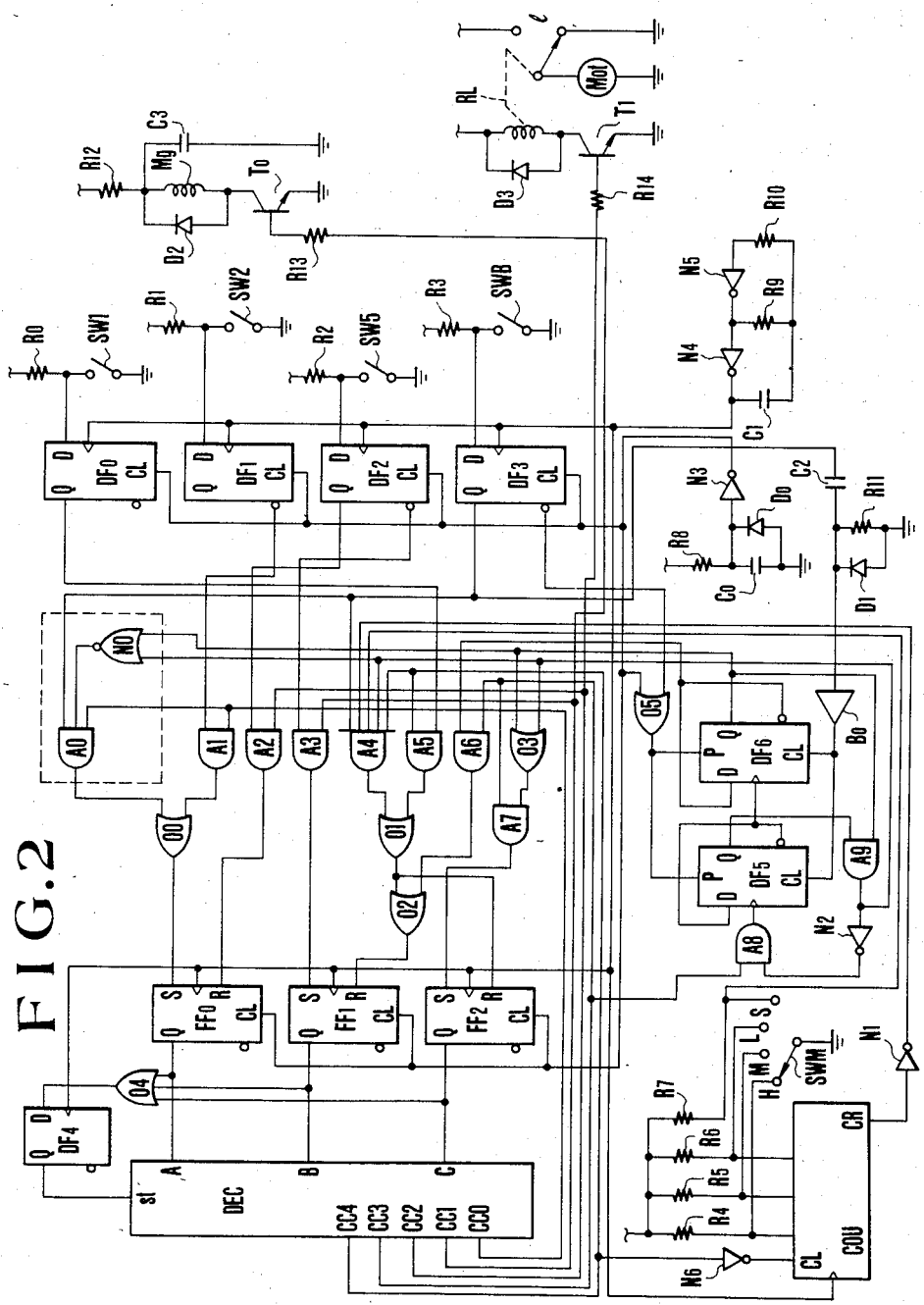
FIG. 2 is a control circuit diagram of the motor driven camera of FIG. 1.

FIG. 2 illustrates a control circuit for the motor driven camera of FIG. 1. Switches SW1, SW2, SW5 and SWB are the switches shown in FIG. 1. D type flip-flops DF0 to DF3 have their D input terminals connected to junctions of the switches SW1, SW2, SW5 and SWB and resistors R0, R1, R2, and R3, respectively. Component N0 is a NOR gate; A0 to A9 are AND gates; O0 to O5 are OR gates. The output at the output state Q of the flip-flop DF0 is applied to the AND gate A5, and the output at the output stage $\overline{Q}$ of the flip-flop DF1 is applied to the AND gate A1. The output of the output stage Q of the flip-flop DF2 is applied to the AND gate 2 while the output at the output stage $\overline{Q}$ is applied to the AND gate A3. The output at the output stage Q of the flip-flop DF3 is applied to the AND gates A0 to A4, while the output at the output stage $\overline{Q}$ is applied to the OR gate O5. The output of the NOR gate N0 is applied to the AND gate A0. Flip-flops FF0, FF1 and FF2 are SR type flip-flops, and flip-flops DF4, DF5, and DF6 are D type flip-flops. The output of the AND gates A0 and A1 are applied through the OR gate O0 to the set terminal S of the flip-flop FF0, and the output of the AND gate A2 is applied to the reset terminal R of the flip-flop FF0. The output of the AND gate A3 is applied to the set terminal S of the flip-flop FF1. The outputs of the AND gates A4 and A5 are applied through the OR gate O1 to the OR gate O2, the output of the AND gate A6 is applied to the OR gate O2, and the output of the OR gate O2 is applied to the reset terminal R of the flip-flop FF1. The outputs of the OR gate O3 is applied to the AND gate A7, and the output of the AND gate A7 is applied to the set terminal S of the flip-flop FF2. Applied to the reset terminal R of this flip-flop FF2 is the output of the OR gate O1. Applied to the input terminals A, B, and C of a decoder DEC are, respectively, the outputs at the output states Q of the flip-flops FF0, FF1, and FF2. The outputs at the output stages Q of the flip-flops FF0, FF1, and FF2 are applied through the OR gate O4 to the input terminal D of the flip-flop DF4. The output at the output stage Q of this flip-flop DF4 is applied to the input terminal St of the decoder DEC. The output CC0 of the decoder is applied to the AND gates A0 and A1, and the output CC1 is applied to the AND gate A3 and also through a resistor R13 to the base of a transistor T0. Connected to this transistor T0 are a resistor R12 and a electromagnetic coil Mg in series. A diode D2 is connected in parallel to the electromagnetic coil Mg, and a condenser C3 is connected in parallel to a series-connected circuit of the electromagnetic coil Mg and the transistor T0. The output CC2 of the decoder DEC is applied to the AND gate A2 and also through a resistor R14 to the base of a transistor T1. Transistor T1 is connected to a relay RL connected in parallel with a diode D3. A relay contact 1 is switchable from one of the electrical power supply throw to a motor Mot and the motor Mot braking throw to the other. The output CC3 of the decoder DEC is applied to the AND gates A6, A7, and A8, and the output CC4 is applied to the AND gates A4 and A5. COU is a counter. The output CC4 of the decoder DEC is applied to the CL terminal of a counter COU through an inverter N6. A parallel connected circuit of resistors R4, R5, and R6, is connected to counter COU to apply the voltage of an electrical power source thereto. A changeover switch SWM is operatively connected to the mode selector 5 of FIG. 1. This changeover switch SWM has fixed contacts H, M, L, and S. Fixed contacts H, M, and L, are connected to the junctions of resistors R4, R5, and R6, and the counter COU, respectively. The opposite or electrical power source side ends of the resistor R4, R5, and R6 is connected through a resistor R7 to the fixed contact S and also to the AND gate A4. The output terminal CR of the counter COU is connected through an inverter N1 to the AND gate A4. A power up clear circuit comprises a condenser C0 across which is connected a diode D0, a resistor R8 and an inverter N3 connected to the junction of the condenser C0 and the resistor R8. The output of this power up clear circuit (hereinafter referred to as "PUC" circuit), or the output of the inverter N3, is applied to the CL terminals of the flip-flops DF0 to DF3 and FF0 to FF2. The output of the inverter N3 along with the output at the output stage $\bar{Q}$ of the flip-flop DF3 is applied through the OR gate O5 to the P terminals of the flip-flops DF5 and DF6. A condenser C2 and a resistor R11 constitute a differentiation circuit, and a diode D1 is connected in parallel to the resistor R11. The output at the output stage Q of the flip-flop DF3 is applied through the differentiation circuit and a buffer circuit B0 to the CL terminals of the flip-flops DF5 and DF6. The outputs at the output stages Q of the flip-flops DF5 and DF6 are applied to the AND gate A9, and the output of this AND gate A9 is applied to the NOR gate N0, the AND gate A4 and the OR gate O3. The output of the AND gate A9 is also applied through an inverter N2 to the CK terminal of the flip-flop DF5, together with the output CC3 of the decoder DEC, through the AND gate A8. The output at the output stage $\bar{Q}$ of the flip-flop DF5 is applied to the input terminal D of the flip-flop DF5 and also to the CK terminal of the flip-flop DF6. The output at the output stage $\bar{Q}$ of the flip-flop DF6 is applied to the input terminal D of the flip-flop DF6, and also to the AND gate A6, and the output at the output stage Q is applied to the NOR gate N0 and the OR gate O3. Resistors R9 and R10 are connected in parallel with each other and an inverter N5 is connected between them. A condenser C1 is connected in parallel to the resistor R9 and an inverter N4 is connected between them. These resistors R9 and R10, condenser C1 and inverters N4 and N5 form an oscillation circuit. The output of the oscillation circuit is applied to the CK terminals of the flip-flops DF0 to DF4 and FF0 to FF2 and to the counter COU.

The frame speed changeover switch SWM is for changing the number of frames per second during continuous shooting, and the resistors R4 to R7 have resistance values related thereto. When the H mode is selected, because the preset value of the counter COU is the lowest, as soon as a count start signal enters the CL terminal of the counter COU, an end signal is produced from the CR terminal. When the switch SWM selects the L mode, because the preset value of the counter COU becomes the highest, responsive to the count start signal at the CL terminal of the counter COU, a timer of relatively long duration works. When the switch SWM selects the M mode, another timer of intermediate duration between those of the H and L modes works.

Figure 3:
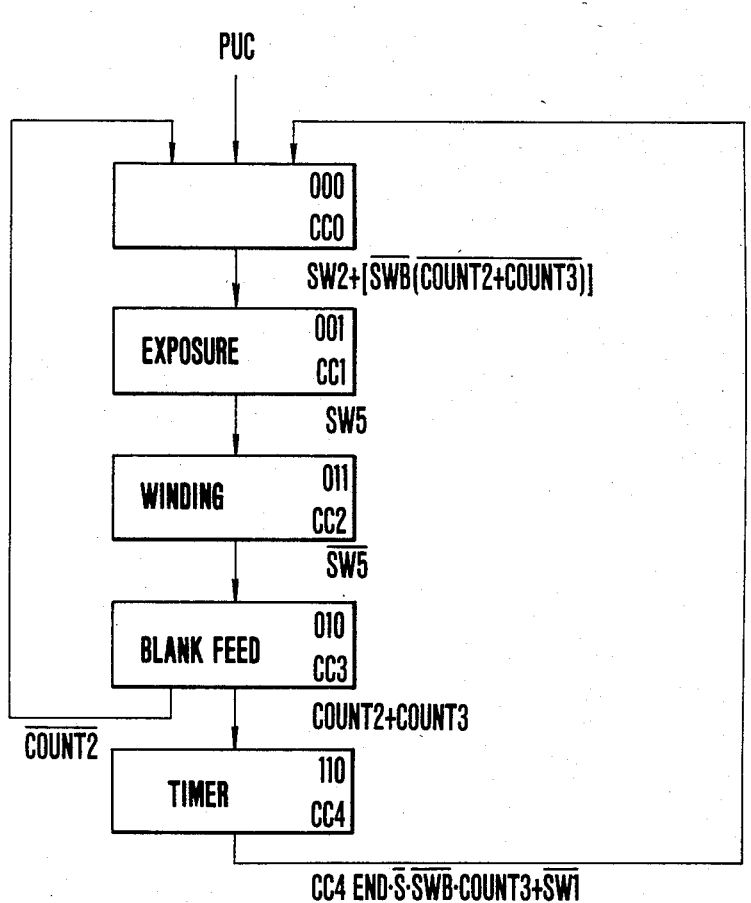
FIG. 3 is a signal flow chart of FIG. 2.

The operation of the control circuit will next be described by reference to FIG. 3.

When an electrical power source switch (not shown) is turned on, the PUC circuit produces an output signal which is then applied to all the flip-flops, thereby setting each flip-flop to the initial value, and presetting flip-flops DF5 and DF6.

With the back cover 4 closed and the switch SwB open, the output at the output stage Q of flip-flop DF3 is applied through the differentiation circuit and buffer circuit B0 to the CL terminals of the flip-flops DF5 and DF6. Thereby, the flip-flops DF5 and DF6 are cleared. However, because the time constant of the differentiation circuit is shorter than the PUC signal, soon after that the flip-flops DF5 and DF6 are set again. Before a release is actuated, the output stages $\bar{Q}$ of the flip-flops DF0 and DF1 are binary "0", and therefore the output of the AND gate A1 is "0" and does not set the flip-flop FF0. The other flip-flops FF1 and FF2 are also similar, the flip-flops FF0 to FF2 being left reset by the PUC signal. Therefore, the decoder DEC selects the CC0 output and the camera awaits in a CC0 state of FIG. 3. When the release is actuated, the switches SW1 and SW2 are both turned on, changing the outputs at the output stages $\bar{Q}$ of the flip-flops DF0 and DF1 to "1". Since the AND gate A1 has its inputs connected to the output $\bar{Q}$ of the flip-flop DF1 and the output CC0 of decoder DEC, the AND gate A1 now produces an output "1", which is applied through the OR gate O0 to the set terminal S of the flip-flop FF0. For this reason, the output at the output state Q of the flip-flop FF0 becomes "1". As the inputs A, B, and C of the decoder DEC become "1", "0" and "0", respectively, for the present time, the CC1 output is selected. This output is applied through the resistor R13 to turn on the transistor T0, thereby driving magnet Mg for camera release actuation. Thus, the shutter runs down, initiating an exposure.

When the exposure is completed, the switch SW5 is turned on, changing the output at the output stage $\bar{Q}$ of the flip-flop DF2 to "1". Since the inputs of the AND gate A3 are connected to the output CC1 and the output of the flip-flop DF2, the AND gate A3 produces an output "1" which is applied to the set terminals S of the flip-flop FF1, thereby setting flip-flop FF1. Therefore, as the inputs, A, B, and C of the decoder DEC become "1", "1", and "0", respectively, for the present time, the CC2 output is selected. This output is applied through the resistor R14 to drive the relay RL, and the relay contact 1 is switched to connect the motor Mot to the electrical power source. As the motor Mot rotates, the film is wound up.

When the film advances one frame, the switch SW5 is turned off, changing the output at the output stage Q of the flip-flop DF2 to "1". Since the inputs of the AND gate A2 are connected to the output CC2 and the output stage $\overline{Q}$ of the flip-flop DF2, the output of the AND gate A2 becmes "1" and is applied to the reset terminal R of the flip-flop FF0. Therefore, as the inputs A, B, and C of the decoder DEC become "0", "1", and "0", respectively, the decoder DEC selects the output CC3.

Meanwhile, the flip-flops DF5 and DF6 remain set by the PUC signal from the PUC circuit. Therefore, both the inputs of the AND gate A9 are "1", and it produces an output "1". This output of AND gate A9 is applied through the OR gate O3 to the AND gate A7. Now, when the output CC3 of the decoder DEC is applied to the other input of the AND gate A7, the output of the AND gate A7 is changed to "1" and is applied to the set terminal S of the flip-flop FF2. Thereby the inputs A, B, and C of the decoder DEC become "0", "1", and "1", respectively, and the decoder DEC produces the output CC4.

Assuming that the switch SWM selects the H mode, then when the decoder DEC produces the output CC4, the output DD4 is applied through the inverter N6 to the counter COU at the CL terminal thereof. Therefore, the counter COU starts a counting operation, but immediately an end signal is produced and is applied to the AND gate A4. Because all the inputs of the AND gate A4 are "1", its output is applied through the OR gate O1 to reset the flip-flop FF2, and also through the OR gates O1 and O2 to reset the flip-flop FF1. Therefore, the inputs A, B, and C of the decoder DEC become "0", "0", and "0", and the decoder DEC selects the output CC0. If the release switch remains ON, this procedure repeats itself with the result that a continuous series of shots are made at the highest frame speed. When the L mode is selected by the switch SWM, because the timer period of the counter COU is long, a continuous series of shots are made at the lowest frame speed as compared with the above. On the other hand, when the switch SWM selects the S mode, the output CC4 is produced at the termination of one cycle of the release actuating followed by the film winding operation. However, since the input of AND gate A4, which is connected to one end of the resistor 7 remains "0", the AND gate A4 does not produce the output "1". If the switch SW1 is left ON, the Q output of the flip-flop DF0 is "0", and because this is applied to the AND gate A5, the AND gate A5 does not produce the output "1". Therefore, the flip-flops FF1 and FF2 are not reset, causing the output CC4 to retain itself. When the switch SW1 is turned off, however, the AND gate A5 produces the output "1", which is applied through the OR gate O1 to reset the flip-flop FF2, and through the OR gates O1 and O2 to reset the flip-flop FF1. Therefore, the decoder DEC produces the output CC0. Thus, the initial state is regained. When the back cover is then opened, the switch SWB is turned on, thereby changing the output at the output stage Q of the flip-flop DF3 to "0". Therefore, the flip-flops DF5 and DF6 are not cleared, and the output at the output stage $\overline{Q}$ of the flip-flop DF3 is applied through the OR gate O5 to the P terminals of the flip-flops DF5 and DF6. Therefore, the flip-flops DF5 and DF6 are left set, the input of the AND gate A9 becomes "1", and the output of this AND gate A9 is inverted by the inverter N2 and applied to the AND gate A8. For this reason, the flip-flops DF5 and DF6 are not responsive to the CC3 pulse due to the next release. Since both inputs of the OR gate O3 are "1", and AND gate A7 is supplied with "1". Since the other input is supplied with the output CC3, the AND gate A7 produces the output "1". As the flip-flop FF2 is set, the inputs A, B, and C of the decoder DEC become "0", "1", and "1", respectively, and the decoder DEC produces the output CC4. Meanwhile the switch SWB is ON, and the Q of the flip-flop DF3 is "0", which is applied to the AND gate A4. Therefore, the AND gate A4 also produces the output "0". Since the switch SW1 remains ON, the Q output of the flip-flop DF0 is "0", which is applied to the AND gate A5. Therefore, the output of the AND gate A5 is also "0". Therefore, since this state is maintained, only one cycle of the releasing and winding operation is effected as the release switch is turned on one time. When the switch SW1 is next turned off, the Q output of the flip-flop DF0 becomes "1", and, because the inputs of the AND gate A5 are connected to the outputs CC4 and the output CC4 and the output stage Q of the flip-flop DF0, the AND gate A5 produces the output "1". Therefore, the flip-flops FF1 and FF2 are reset. As the inputs A, B, and C of the decoder DEC become "0", "0", and "0", the decoder DEC selects the output CC0. A similar operation is repeated each time the shutter button is pushed down. That is, with the back cover open, the single frame operation takes place regardless of what frame speed mode has been preset in the camera.

When the back cover is closed, the switch SWB is turned off and the Q output of the flip-flop DF3 is changed to "1". Meanwhile, the $\overline{Q}$ output of the flip-flop DF3 is applied through the OR gate O5 to the P terminals of the flip-flops DF5 and DF6, so that the flip-flops DF5 and DF6 are responsive to the clock input. At the same time, the Q output of the flip-flop DF3 is applied through the differentiation circuit to the CL terminals of the flip-flops DF5 and DF6, so that the flip-flops DF5 and DF6 are reset by the differentiation pulse. Therefore, the output of the AND gate A9 is "0", thereby releasing AND gate A8 from clock input hindrance. Now, when the release switches SW1 and SW2 are turned on, the flip-flops DF0 and DF1 produce the $\overline{Q}$ outputs "1" which are applied through the AND gate A1 and OR gate O0 to the S terminal of the flip-flop FF0, thereby setting flip-flop FF0. Therefore, the decoder DEC produces the output CC1 and an exposure is initiated. At the termination of the exposure, the switch SW5 is turned on, thereby changing the $\overline{Q}$ output of the flip-flop DF2 to "1". This output is applied through the AND gate A3 to the S terminal of the flip-flop FF1, thereby setting flip-flop FF1. Therefore, the decoder DEC produces the output CC2 and the film starts to advance. When the film has advanced one frame, the switch SW5 is turned off, thereby changing the Q output of the flip-flop DF2 to "1". This output is applied through the AND gate A2 to the R terminal R of the flip-flop FF0, thereby resetting the flip-flop FF0. The decoder DEC then produces the output CC3. Since the outputs of the AND gate A8 are connected to the output CC3 and the output of the inverter N2, because at this time the output of the inverter N2 is "1", one clock pulse is applied to the CK terminal of the flip-flop DF5. Thus, the Q output of the flip-flops DF5 and DF6 become "1" and "0". The $\overline{Q}$ output of the flip-flop DF6 is "1" is applied to the AND gate A6, and the output of the AND gate A6 is applied through the OR gate O2 to the R terminal of the flip-flop FF1, thereby resetting flip-flop FF1. Therefore, the decoder DEC produces the output CC0. If the switches SW1 and SW2 then continue closing, the next cycle of releasing and advancing operation proceeds. When the film has advanced one frame, the decoder produces the output CC3. Because the CK terminals of the flip-flops DF5 and DF6 receive the second clock pulse, their Q outputs become "0" and "1", respectively. The Q output of the flip-flop DF6 is applied through the OR gate O3 to the AND gate A7. Because the other input of the AND gate A7 is CC3, the AND gate A7 produces an output of "1" which is applied to the S terminal of the flip-flop FF2, thereby setting flip-flop FF2. Therefore, the decoder DEC produces the output CC4. However, because the Q output of the flip-flops DF5 and DF6 are "0" and "1", the output of the AND gate A9 is "0". Responsive to this, the AND gate A4 also produces the output "0". Additionally, since the inputs of the AND gate A5 are connected to the output CC4 and the Q output of the flip-flop DF0, if the switch SW1 is ON, it holds this state. That is, regardless of the position of the mode switch SWM, after two frames have been shot at the fastest frame speed, the camera stops. Then when the switch SW1 is turned off, the Q output of the flip-flop DF0, which is "1", is applied to the AND gate A5. The output of the AND gate A5, which is "1", is applied through the OR gates O1 and O2 to the R terminal of the flip-flop FF1 thereby resetting flip-flop FF1. When the release switch turns on again, the third cycle of releasing and winding operation proceeds, producing output CC3. Since, at this time, a clock pulse is applied through the AND gate A8 to the flip-flops DF5 and DF6, their Q outputs both become "1", and the output of the AND gate A9 becomes "1". Therefore, from this time onward, any clock pulse is prohibited from entering the CK terminal of the flip-flop DF5. That is, hereinafter, shots are recycled in the selected mode by the mode switch SWM.

The AND gate A0 and the NOR gate N0 are connected as shown in the dashed line block of FIG. 2 so that when the back cover is closed and the switch SWB is turned off, the Q output of the flip-flop DF3 changes to "1" and clears the flip-flops DF5 and DF6, because they are connected to the CL terminals through the differentiation circuit and the buffer amplifier B0. At the same time, because the inputs of the NOR gate N0 are both "0", it produces the output "1". Since the other two inputs of AND gate A0 are connected to the Q output of the flip-flop DF3 and the output CC0, the AND gate A0 produces the output of "1", which is applied through the OR gate O0 to the S terminal of the flip-flop FF0, thereby setting flip-flop FF0. The decoder DEC then produces the output CC1, initiating an exposure followed by advancing the film. After that, the decoder DEC produces the output CC3, which is applied through the AND gate A8 to the CK terminals of the flip-flops DF5 and DF6. Therefore, their outputs become "1" and "0", respectively. At this time, similar to the above, the Q̄ output of the flip-flop DF6, which is now "1", is applied to the AND gate A6. The output of the AND gate A6, which is "1", is applied through the OR gate O2 to set the flip-flop FF1. Therefore, the decoder DEC produces the output CC0. This procedure repeats itself once more. Then, when the decoder DEC produces the output CC3, the flip-flops DF5 and DF6, responsive to the clock at the CK terminals thereof, change their outputs to "0" and "1", respectively. Thus, the initial state is regained with the output CC0. At this time, one of the inputs of the NOR gate N0 is "1" and its output is "0". Therefore, the output of the AND gate A0 becomes "0". From this time onward, it is possible to actuate a release with switch SW2. It is to be understood that when the back cover is closed, feeding of two blank frames at the fastest speed mode is automatically effected, and after that the camera is automatically stopped.

Although the foregoing embodiment has been described with the limitation of the number of blank frames to two, it is needless to say that the necessary number of blank frames may be varied depending on the construction of the camera until a fresh area of the film appears at the exposure aperture.

As has been described above, according to the present invention, either when the release switch is turned on just after the back cover has been closed, or when the back cover is closed, the camera is switched to the fastest frame speed mode, in which the film is automatically fed a prescribed number of frames, regardless of what frame speed mode has been preset, thereby giving the advantage that the shot preparing operation is carried out most quickly and the mobility of the motor driven camera can be fully utilized.

When the blank frame feeding operation is terminated, the camera is automatically switched from the fastest frame speed mode to the preset mode by the mode switch, so that the photographer does not need to renew the setting operation of the preset mode after the termination of the blank frame feeding operation and is permitted to proceed to take shots directly after the camera has been loaded with film.

In the present invention, film feeding under the condition that the back cover of the camera body is open is regarded as a film loading operation. To perform the film loading operation, therefore, the camera is automatically switched to the lowest frame speed mode effective, particularly, for a single shot mode thereby carrying out the film loading operation with ease.

What is claimed is:

1. A motor driven camera comprising:
   (a) film feeding means operable at a plurality of selected frame speed modes in response to driving power from an electric motor for advancing a film;
   (b) frame speed mode selecting means for selecting the frame speed modes of said film feeding means;
   (c) blank frame advancing switch means for producing a blank feeding start signal; and
   (d) blank frame advancing control means responsive to the blank feeding start signal for cancelling the frame speed mode selected by said frame speed mode selecting means and forcibly selecting the fastest speed mode from among the plurality of frame speed modes for operating said film feeding means to advance the film a number of blank frames.

2. A motor driven camera according to claim 1, wherein
   said film feeding means has a variable time interval between two successive frames as the film is advanced by the motor so that a plurality of frame speed modes can be formed.

3. A motor driven camera according to claim 1, wherein
   the blank feeding start signal from said blank frame advancing switch means is produced by formation of a closed state detecting signal from a switch detecting when a back cover of the camera is closed.

4. A motor driven camera according to claim 1, wherein the blank feeding start signal from said blank frame advancing switch means is produced by formation of a first release switch actuation signal responsive to the formation of a closed state detecting signal from a switch for detecting when a back cover of the camera is closed.

5. A motor driven camera according to claim 1, wherein
the blank feeding operation by said blank frame advancing control means is performed for a prescribed number of preset frames.

6. A motor driven camera according to claim 1, wherein
said film feeding means is detachably secured to a camera body.

7. A motor driven camera comprising:
(a) film feeding means operable at a plurality of selected frame speed modes and responsive to driving power from an electric motor for advancing a film;
(b) frame speed mode selecting means for selecting a frame speed mode of said film feeding means;
(c) blank frame advancing switch means for producing a blank feed start signal; and
(d) blank feed control means responsive to the blank feed start signal from said blank frame advancing switch means for cancelling the frame speed mode selected by the fastest speed mode from among the plurality of frame speed modes for operating said film feeding means to advance the film by a prescribed number of frames and for then returning to the frame speed mode previously selected by the frame speed mode selecting means.

8. A motor driven camera comprising:
(a) film feeding means operable with a plurality of selected frame speed modes and receptive of driving power from an electric motor for advancing a film;
(b) changeover means for producing a changeover signal for varying the frame speed mode of said film feeding means;
(c) blank frame advancing switch means for producing a blank feeding start signal; and
(d) blank frame advancing control means responsive to the blank feeding start signal from said blank frame advancing switch means for forcibly selecting a preset high speed mode from among the plurality of selected frame speed modes for operating said film feeding means to advance the film.

9. A motor driven camera according to claim 8, wherein
said film feeding means has a variable time interval between two successive frames as the film is advanced by the motor so that a plurality of frame speed modes can be formed.

10. A motor driven camera according to claim 8, wherein
the blank feeding start signal from said blank frame advancing switch means is produced by formation of a closed state detecting signal from a switch detecting when a back cover of the camera is closed.

11. A motor driven camera according to claim 8, wherein
the blank feeding start signal from said blank frame advancing switch means is produced by formation of a first release switch actuation signal responsive to the formation of a closed state detecting signal from a switch for detecting when a back cover of the camera is closed.

12. A motor driven camera according to claim 8, wherein
the blank feeding operation by said blank frame advancing control means is performed for a prescribed number of preset frames.

13. A motor driven camera according to claim 8, wherein
said film feeding means is detachably secured to a camera body.

14. A motor driven camera comprising:
(a) film feeding means having set therein a plurality of frame speed modes including a single shot mode and responsive to supply of driving power from an electric motor to advance a film;
(b) frame speed mode selecting means for selecting the frame speed modes of said film feeding means;
(c) film loading switch means for producing a film load signal;
(d) release switch means for producing an operation start signal for initiating an operation of said film feeding means; and
(e) film loading control means responsive to production of the operation start signal from said release switch means when the film load signal from said film loading switch means is preset for cancelling the frame speed mode selected by said frame speed mode selecting means and forcibly selecting the single shot mode from among said plurality of frame speed modes for operating said film feeding means.

15. A motor driven camera according to claim 14, wherein
said film feeding means has a variable time interval between two successive frames as the film is advanced by the motor so that a plurality of frame speed modes can be formed.

16. A motor driven camera according to claim 14, wherein the film load signal from said film loading switch means is produced by formation of an open state detecting signal from a switch for detecting when a back cover of the camera is open.

17. A motor driven camera according to claim 14, wherein
said film feeding means is detachably secured to a camera body.

18. A motor driven camera comprising:
(a) film feeding means operable with a plurality of selected frame speed modes and receptive of driving power from an electric motor for advancing a film;
(b) changeover means for producing a changeover signal to vary the frame speed mode of said film feeding means;
(c) blank frame advancing switch means for producing a blank feeding start signal;
(d) film loading switch means for producing a film load signal;
(e) release switch means for producing an operation start signal to initiate operation of said film feeding means;
(f) film loading control means responsive to the operation start signal when the film load signal from said film loading switch means is preset for cancelling the selected frame speed mode and forcibly selecting a single shot mode from among said plurality of frame speed modes for operating said film feeding means; and (g) blank frame advancing control means responsive to the blank feeding start signal for forcibly selecting a preset high speed mode from among the plurality of frame speed modes of said film feeding means for operating said film feeding means to advance the film.

19. A motor driven camera comprising:
(a) frame speed mode selecting means for selecting a frame speed of a film;
(b) film feeding means for winding the film at a frame speed corresponding to the selection of said frame speed mode selecting means; and
(c) blank frame advancing control means for overriding the frame speed mode selected by said frame speed mode selecting means and forcibly selecting the fastest speed mode from the frame speed modes for use in operating said film feeding means when blank frames are advanced.

20. A motor driven camera comprising:
(a) frame speed mode selecting means for selecting a frame speed of a films;
(b) film feeding means for winding the film at a frame speed corresponding to the selection of said frame speed mode selecting means; and
(c) blank frame advancing control means for overriding the frame speed mode selected by said frame speed mode selecting means and for operating said film feeding means at a high-speed mode when blank frames are advanced.

* * * * *